United States Patent [19]
Venkataswamy et al.

[11] Patent Number: 6,069,202
[45] Date of Patent: May 30, 2000

[54] THERMOPLASTIC ELASTOMER TRIBLEND FROM AN ENGINEERING THERMOPLASTIC, FUNCTIONALIZED ETHYLENE AND OR DIENE POLYMER, AND BROMINATED ISOBUTYLENE P-METHYLSTYRENE COPOLYMER

[75] Inventors: Krishna Venkataswamy, Akron, Ohio; Jacques Horrion, Tilff, Belgium

[73] Assignee: Advanced Elastomer Systems, L.P., Akron, Ohio

[21] Appl. No.: 08/987,989

[22] Filed: Dec. 10, 1997

[51] Int. Cl.[7] .............. C08L 77/00; C08L 77/12; C08L 67/00; C08L 81/00
[52] U.S. Cl. ............... 525/66; 525/64; 525/67; 525/68; 525/70; 525/71; 525/73; 525/92 A; 525/92 B; 525/92 D; 525/92 E; 525/92 F; 525/92 J; 525/92 M; 525/133; 525/153; 525/166; 525/167; 525/185; 525/186; 525/189; 525/203; 525/207; 525/238
[58] Field of Search ................. 525/66, 64, 67, 525/68, 70, 71, 73, 92 A, 92 B, 92 D, 92 E, 92 F, 92 J, 92 M, 133, 153, 166, 167, 185, 186, 189, 203, 207, 238

[56] References Cited

U.S. PATENT DOCUMENTS

| | | | |
|---|---|---|---|
| 4,305,865 | 12/1981 | Okada et al. | 260/42.18 |
| 4,338,413 | 7/1982 | Coran et al. | 525/179 |
| 4,966,940 | 10/1990 | Tsuji et al. | 525/66 |
| 5,003,033 | 3/1991 | Olivier | 525/66 |
| 5,006,601 | 4/1991 | Lutz et al. | 525/66 |
| 5,013,793 | 5/1991 | Wang et al. | 525/195 |
| 5,075,380 | 12/1991 | Lindner et al. | 525/183 |
| 5,162,445 | 11/1992 | Powers et al. | 525/333.4 |
| 5,238,990 | 8/1993 | Yu et al. | 524/504 |
| 5,244,961 | 9/1993 | Yu et al. | 524/514 |
| 5,453,465 | 9/1995 | Yu et al. | 525/179 |
| 5,525,668 | 6/1996 | Olivier | 524/504 |
| 5,574,105 | 11/1996 | Venkataswamy | 525/179 |

FOREIGN PATENT DOCUMENTS

WO 92/02582  2/1992  WIPO .

*Primary Examiner*—Ana Woodward
*Attorney, Agent, or Firm*—William A. Skinner; Samuel B. Laferty

[57] ABSTRACT

Desirable thermoplastic vulcanizates can be prepared from a polar engineering thermoplastic; a halogenated copolymer of p-alkylstyrene and an isomonoolefin having from 4 to 7 carbon atoms; and either an ethylene rubbery polymer or a diene based rubbery polymer or combinations thereof. The ethylene rubbery polymer desirably has at least one pendant carboxylic acid group, amine group, epoxy group, hydroxyl group or an anhydride of two carboxylic acid groups or combinations thereof. Desirable diene based rubbery polymers include epoxidized natural rubber and epoxidized homopolymers and copolymers of dienes.

20 Claims, No Drawings

6,069,202

THERMOPLASTIC ELASTOMER TRIBLEND FROM AN ENGINEERING THERMOPLASTIC, FUNCTIONALIZED ETHYLENE AND OR DIENE POLYMER, AND BROMINATED ISOBUTYLENE P-METHYLSTYRENE COPOLYMER

FIELD OF INVENTION

This invention relates to a thermoplastic vulcanizate which has improved high temperature performance while retaining excellent elongation characteristics. The thermoplastic vulcanizates herein comprise a polar thermoplastic phase, an ethylene diene based rubbery polymer and a functionalized olefinic rubber such as a brominated copolymer of paramethylstyrene and isobutylene. Thermoplastic vulcanizate is generally defined as a blend of polymers that can be processed in the same way as a conventional thermoplastic material yet has properties and performances similar to that of a vulcanized rubber.

BACKGROUND OF THE INVENTION

Thermoplastic vulcanizates based on crystalline polyolefin thermoplastics and vulcanized polyolefin rubbers have found wide commercial use. Due to the low melting point of the crystalline polyolefin thermoplastic phase these vulcanizates may be limited to use temperatures below 150° C. Due to the substantially hydrocarbon nature of both phases of these thermoplastic vulcanizates they experience high swelling in hydrocarbon oil such as ASTM#3 oil. Therefore, it would be desirable to develop a thermoplastic vulcanizate from a polar thermoplastic with a rubber with sufficient polarity to minimize swelling with hydrocarbon oils. U.S. Pat. No. 5,574,105 describes a triblend thermoplastic elastomer having a higher use temperature that may include a polyamide thermoplastic phase, a crystalline polyolefin phase and a brominated copolymer of paramethylstyrene and isobutylene. The patent further defines a compatibilizing agent such as can be prepared from the reaction product of a polyamide (nylon) and a carboxyl functionalized polypropylene by melt mixing nylon 6 with a propylene grafted with from 0.1 to 2.0 weight percent maleic anhydride. These compositions have very good elongation. They have relatively high shore D hardness.

U.S. Pat. Nos. 5,003,003 and 5,525,668 (a division of the first) describe thermoplastic elastomer compositions from dispersing a polymonoolefin elastomer phase containing functionalized EPM or EPDM in a polyamide resin. The functionalization of the EPM or EPDM improves the compatibility of the EPM or EPDM with the polyamide and results in improved properties for thermoplastic vulcanizates therefrom. While these compositions have a desirable polar thermoplastic phase they still have a substantially nonpolar hydrocarbon rubber phase capable of high swelling in hydrocarbon solvents.

U.S. Pat. Nos. 5,244,961 and 5,453,465 (a division of the first) disclose thermoplastic polyamide compositions modified with an elastomeric halogen containing copolymer of a $C_4$–$C_7$ isomonoolefin and a paraalkylstyrene. The patents set forth the desirability of specified metal compounds capable of absorbing or reacting with hydrogen halide.

U.S. Pat. No. 5,238,992 describes a thermoplastic composition comprising a polyamide and a grafted copolymer of an isomonoolefin and alkylstyrene, such as a maleic anhydride grafted copolymer of isobutylene and paramethylstyrene. International publication WO 92/025 82, which was published Feb. 20, 1992 and is assigned to Advanced Elastomers Systems, describes thermoplastic compositions comprising a blend of a thermoplastic engineering resin which can be a polyamide and a halogen containing copolymer of a $C_4$–$C_7$ isomonoolefin with paraalkylstyrene.

SUMMARY OF THE INVENTION

Thermoplastic blends of a polar thermoplastic engineering polymer e.g., a polyamide, a functionalized ethylene or a diene rubbery polymer, and a halogenated copolymer of paramethylstyrene and isobutylene are described. These blends can be dynamically vulcanized to result in a thermoplastic vulcanizate with higher elongation to break than typically achieved with prior blends of a polyamide and a halogenated copolymer of paramethylstyrene and isobutylene. Desirably these blends and vulcanizates include rubbery polymers of ethylene which may have pendant carboxyl, epoxy, hydroxyl, or amine groups or pendant anhydride from two carboxyl groups; or epoxidized natural rubber or epoxidized polydiene rubbers or blends thereof. Examples of the basic rubbery ethylene polymers include ethylene-acrylic copolymers, ethylene-propylene copolymers, ethylene-propylene-diene copolymers, etc. Examples of polyamides include nylon 6, nylon 12, nylon 6,6, etc. extrusion or molding grades.

DETAILED DESCRIPTION OF THE INVENTION

Engineering Resin

The thermoplastic engineering resins used in the compositions of the invention are amorphous or semicrystalline materials, usually polar in nature, with a glass transition temperature (Tg) or melting point (Tm) from about 150° C. to about 275° C., and preferably about 200° C. to about 250° C. They may be used singly or in combination, and are selected from polyamides, polycarbonates, polyesters, polysulfones, polylactones, polyacetals, acrylonitrile-butadiene-styrene (ABS) resins, polyphenylene oxide (PPO), polyphenylene sulfide (PPS), styrene acrylonitrile (SAN) resins, styrene maleic anhydride polymers (SMA) and aromatic polyketones. Preferred thermoplastic engineering resins are polyamides. The more preferred polyamides are nylon 6; nylon 6,6; nylon 11; nylon 12, nylon 6,12 and mixtures or copolymers thereof.

Suitable thermoplastic polyamides (nylons) include crystalline or resinous polyamides, (including copolymers, block copolymers, and terpolymers) having recurring amide units within the polymer chain. If block polyamide copolymers are used they desirably have at least 40, 60, or 75 weight percent amide repeat units. Polyamides may be prepared by polymerization of one or more epsilon lactams having from about 3 or 4 to about 12 and preferably from about 5 or 6 to about 12 carbon atoms such as caprolactam, pyrrolidone, lauryllactam and aminoundecanoic lactam, or amino acid, or by condensation of dibasic acids having from 3 to 20 carbon atoms, more desirably 3 to 12 carbon atoms and diamines having from 1 to 20 carbon atoms, more desirably from about 1 to 12 carbon atoms. Both fiber-forming and molding grade nylons are suitable. Examples of such polyamides are polycaprolactam (nylon 6), polylauryllactam (nylon 12), polyhexamethyleneadipamide (nylon 6,6), polyhexamethyleneazelamide (nylon 6,9), polyhexamethylenesebacamide (nylon 6,10) polyhexamethyleneisophthalimide (nylon 6, IP), and the condensation product of 11-aminoundecanoic acid (nylon 11). Additional examples of satisfactory polyamides (especially those having a softening point below 275°

C.) are described in Kirk-Othmer, Encyclopedia of Chemical Technology, 3d edition, vol. 18, pages 406–409, and Encyclopedia of Polymer Science and Engineering, 2d edition, vol. 11, pages 445–450. Commercially available thermoplastic polyamides may be advantageously used in the practice of this invention, with linear crystalline polyamides having a softening point or melting point between 160° and 230° C. being preferred.

An endcapped polyamide can be used in the thermoplastic vulcanizate in lieu of a conventional polyamide. These desirably are at least 70, 80, or 90 mole percent endcapped.

Brominated Copolymer of p-Methylstyrene and Isobutylene

A preferred rubber for these compositions is a halogenated copolymer derived from the polymerization of a paraalkylstyrene having from 9 to 12 carbon atoms and an isomonoolefin having from 4 to 7 carbon atoms. These copolymers are more fully described in U.S. Pat. No. 5,162,445 the disclosure which is incorporated herein by this reference. A particularly preferred species is a halogenated copolymer of isobutylene and paramethylstyrene and a preferred halogen is bromine. Desirably the isobutylene is from about 99 to about 88 weight percent of the copolymer, more desirably from about 98 to about 92. Desirably the paramethylstyrene is from about 1 to about 12 weight percent of the copolymer and more desirably from about 2 to about 8. Desirably the bromine is from about 0.1 to about 5 and more desirably from about 0.1 to about 2.5 weight percent of the halogenated copolymer. The non-halogenated copolymer components (repeat units) are from about 92 to about 99 weight percent, more desirably about 92 to about 97 weight percent and preferably from about 92.5 to about 95 weight percent of the halogenated copolymer. These halogenated copolymers are generally compatible with many traditional rubbers (e.g. EPDM, natural rubber, halogenated butyl rubber, etc). The non-halogenated form of the copolymers of paraalkylstyrene and isomonoolefins of 4 to 7 carbon atoms are significantly less reactive in most crosslinking reactions. These non-halogenated copolymers can be included in the halogenated component (e.g. copolymers of paraalkylstyrene and isomonoolefins of 4 to 7 carbon atoms) where they will act as polymeric plasticizers for the crosslink component.

Olefinic Rubbery Polymer

The olefinic rubbery polymers which include polymers of 2 or more different monomers have been found to result in increases in ultimate tensile strength, modulus and elongation of the resulting dynamic vulcanizate. The term olefinic rubbery polymer will be interpreted for the purposes of this specification to mean an olefinic rubbery polymer other than a halogenated copolymer of p-alkylstyrene and an isomonoolefin of 4 to 7 carbon atoms, which is described as a separate component. These copolymers may have carboxyl, hydroxyl, amine, or epoxy groups; either pendant or terminal; or anhydrides of carboxyl groups; pendant or terminal thereon; or any combinations thereof. Olefinic rubbery copolymers include polymers from two or more monoolefins having from 2 to 8, or 10 carbon atoms, optionally with a polyene of 4 to 20 carbon atoms such as 1,4-hexadiene, ethylidene norbornene, and vinyl norbornene. Specific examples include EPR (ethylene-propylene polymers) and EPDM (ethylene-propylene-diene polymers). The ethylene copolymers can alternatively be functionalized with hydroxyl, amine, or epoxy groups by functionalization.

These polymers desirably have sufficient amounts of non-ethylene repeat units such they are rubbery at 25° C. rather than thermoplastic. Generally about 50 to about 75 weight percent of the ethylene rubbery polymers are repeat units from ethylene. The remainder, e.g. about 25 to about 50 weight percent are desirably repeat units from another monoolefin having from 3 to 12 carbon atoms, and in the case of EPDM a small percentage of repeat units, e.g. about 1 to 10 weight percent from a nonconjugated diene. These polymers can be functionalized with carboxyl groups or anhydrides thereof if desired by three different techniques. The techniques for functionalizing the ethylene copolymers with carboxyl or anhydride groups include copolymerizing a small amount of carboxyl group or anhydride group containing monomers with the other monomers of the copolymer. Examples of such monomers that can be copolymerized with ethylene include acrylic acid, itaconic acid, maleic acid, etc. These carboxyl groups or anhydrides of two carboxyl groups containing monomers desirably have from about 3 to about 12 carbon atoms and one or more carbon to carbon double bond.

A second technique for incorporating carboxyl groups or anhydrides thereof onto these copolymers is by grafting a preformed copolymer with a carboxyl containing monomer such as described above. A preferred grafting monomer is maleic anhydride which is conveniently grafted onto ethylene propylene copolymers (EPR) or ethylene propylene diene copolymers (EPDM) using elevated temperatures and free radical generating substances such as peroxides. These maleic anhydride grafted polymers are commercially available or can be made in conventional mixing equipment such as Brabenders™, Banburys™, or twin screw extruders, or other mixing extruders.

A third method of functionalizing the ethylene rubbery polymers is using high shear in the above mixing equipment to fracture the polymers in the presence of these monomers described above containing a carboxyl group or groups or anhydrides thereof. This provides grafting of the monomers on or near the chain ends formed by fracture.

It is desirable that olefinic polymers do not include sufficient crystallinity to preclude obtaining the desired rubbery properties in a thermoplastic vulcanizate. The amount of repeat units containing carboxyl and/or anhydride groups, if present, is desirably from about 0.01 or 0.1 mole percent to about 5 mole percent of the total repeat units of the copolymer. A more desirable range of carboxyl groups and/or anhydride thereof, containing repeat units is from about 0.2 or 0.5 to about 2 mole percent based on the total repeat units of the olefinic rubbery polymer.

Alternatively the functionalized olefinic rubbery polymer can be an epoxidized natural rubber or epoxidized diene based elastomer. The diene based elastomers include dienes having from 4 to 12 carbon atoms either as homopolymers or copolymers of two or more monomers. The diene based elastomers desirably have at least 50 weight percent repeat units from one or more dienes having from 4 to 12 carbon atoms. The diene based elastomers may include substantial amounts of (e.g. up to 50 weight percent) repeat units from vinyl aromatic monomers such as styrene or alkyl substituted styrene having from 8 to 12 carbon atoms. Examples are styrene-butadiene-styrene and styrene-isoprene-styrene copolymers known as SBS or SIS. The diene based elastomers may include smaller amounts of (e.g. up to 30 weight percent) repeat units from one or more other polymerizable unsaturated monomers. The diene based elastomers may be hydrogenated to remove at least 50, 90, or 95 percent of the residual unsaturation after polymerization. Hydrogenation minimizes property changes on heat aging. Examples of hydrogenated polymers are styrene-ethylene-butylene styrene copolymers (SEBS) and styrene-ethylene-propylene-styrene copolymers (SEPS)

The engineering thermoplastic is desirably from about 10 to about 90 phr, more desirably from about 20 to about 80 phr, and preferably from about 30 or 40 to about 60 or 70 phr, wherein phr is parts by weight per 100 parts by weight of rubber.

The rubber is comprised of the olefinic rubbery polymer optionally functionalized with carboxyl, anhydride, hydroxyl, amine, or epoxy group and a halogenated copolymer of a para-alkyl styrene and an isomonoolefin of 4 to 7 carbon atoms. The olefinic rubbery polymer is desirably present in a weight ratio of from 5:95 to 95:5 with respect to the halogenated copolymer of p-alkylstyrene and isomonoolefin; more desirably from about 10:90 to 90:10 and preferably from about 20:80 to about 80:20.

An endcapped polyamide can be used that is less reactive with the halogenated copolymer of paraalkylstyrene and isomonoolefin of 4 to 7 carbon atoms. The end-capped polyamide polymers have some similarities to the carboxylated or anhydride functionalized ethylene or diene rubbery polymers in that they reduce the interaction of the thermoplastic phase, e.g. polyamides with the functionalized olefinic rubbers, e.g. halogenated copolymers of paraalkylstyrene and the isomonoolefins. It is noted however that the addition of carboxylated or anhydride functionalized copolymers of ethylene in the accompanying data resulted in higher ultimate tensile, greater percent elongation, and higher modulus than does the mere end-capping of the polyamide.

Without the olefinic rubbery polymers, optionally functionalized, the thermoplastic phase, e.g. polyamide, may react to an undesired extent with the halogenated copolymer of paraalkylstyrene and isomonoolefin. These reactions between the thermoplastic phase and rubber phase are desirable if they occur to a small extent but often result in undesirable properties if they occur too extensively.

Curing Systems

The elastomer (rubber and rubbery polymer) component of the thermoplastic vulcanizate would generally be at least partially vulcanized or crosslinked. Those skilled in the art would appreciate the appropriate quantities, types of cure systems and vulcanization conditions required to carry out the vulcanization of the rubber component. The rubber component can be vulcanized using varying amounts of curative, varying temperatures, and varying time of cure in order to obtain optimum crosslink density for any particular application. Any known cure system can be used as long as it is suitable for use under the vulcanization conditions for the rubber or combination of rubbers being used and is compatible with the engineering thermoplastic component. For the purposes of this application a curative compatible with the engineering thermoplastic component will be defined as one that does not degrade the engineering thermoplastic component and will not result in the excessive evolution of sufficient volatile components which may degrade the physical properties of the resulting thermoplastic vulcanizate. These compounds tend to absorb and deactivate any halogen released from the halogenated polymer. The curatives operable in this invention include MgO, ZnO, sulfur, sulfur donors, HVA-2(N,N'-m-phenylenedimaleimide), Vantox MTI (2-mercapto-tolylimidazole), metal oxides, resin systems, maleimides, azonitriles, peroxides, both with and without accelerators and co-agents. Phenolic resin curatives are used for the preparation of thermoplastic vulcanizates of the invention and such cure systems are well known to the art and literature of vulcanization of elastomers. Curing through hydrosilylation as disclosed in U.S. Pat. No. 5,672,660, herein incorporated by reference, can also be used. The use of phenolic curatives is more fully described in U.S. Pat. No. 4,311,628 which is hereby fully incorporated by reference.

Additives

The thermoplastic vulcanizates of the present invention may include reinforcing and non-reinforcing fillers, plasticizers for the polar engineering thermoplastic resin and rubber, antioxidants, stabilizers, rubber processing oils, extender oils, lubricants, antiblocking agents, antistatic agents, waxes, foaming agents, pigments, flame retardants and other processing aids known in the rubber compounding art. The additives can be added during the preparation of the thermoplastic vulcanizate or during the preparation of the finished composition or both provided the total amount of additives does not exceed about 100 phr, more preferably not to exceed about 25 or 50 phr.

Fillers and extenders which can be utilized include conventional inorganics such as calcium carbonate, clays, silica, talc, titanium dioxide, carbon black and the like. The rubber processing oils are generally paraffinic, napthenic or aromatic oils derived from petroleum fractions. The type will be that ordinarily used in conjunction with the specific rubber present in the thermoplastic vulcanizate, and the quantity will be based on the total rubber content and may range from about zero to about 100, 150, or 200 phr hundred (parts by weight per 100 parts by weight of rubber).

EXAMPLES

The thermoplastic vulcanizate may be prepared by blending the polar engineering thermoplastic polymer, the halogenated copolymer of p-alkylstyrene and a isomonoolefin having from 4 to 7 carbon atoms, and the olefinic rubbery polymer optionally functionalized in a Brabender mixer of 60 cc capacity at a temperature of about 220 to about 260° C. The speed of the mixer is in the range from about 60 to 200 rpms. Any order of addition of the three major components and additives can be used. After the components are well dispersed the curative system is added to initiate dynamic vulcanization. Mixing is continued until a maximum of a mixing torque indicates that vulcanization has occurred. This usually occurs between 1 and 5 minutes. The mixing is continued usually for 1 to 5 minutes after the maximum torque is noted on the mixing equipment. The vulcanized composition is removed from the mixer, cool pressed, then returned to the mixer for an additional one to two minutes of mixing at 220–260° C. The following examples illustrate how bromo XP-50 (brominated copolymer of paramethylstyrene and isobutylene) can be incorporated into a polyamide resin (optionally end-capped) to result in a thermoplastic vulcanizate with higher elongation, higher ultimate tensile strength, and generally higher modulus than the same blend without an ethylene copolymer. The polyamide is generally nylon 6. The maleated EPDM is an example of an ethylene copolymer with pendant or terminal carboxyl or anhydride groups.

The samples were prepared according to the general procedure for mixing thermoplastic vulcanizates. The maleated EPDM, when present, was added prior to bromo XP-50 or generally at the same time. Any order of adding the two rubber components (including curatives) and the thermoplastic component can be used as long as the rubber(s) is well dispersed prior to actual curing. The olefinic rubber polymer or the halogenated copolymer could be added first, optionally either rubber component may be partially or fully cured and then the other rubber added and still be within the general disclosure.

The stress-strain properties were generally determined in accordance with the test procedures in ASTM D412. These properties include tension set (TS), ultimate tensile strength (UTS), 100% modulus (M 100%) and % elongation at break (% elongation). Compression set was generally determined by ASTM D-395, Method B, by compressing the sample for 22 hours at 125° C. Oil swell (OS) percent change in weight is determined in accordance with ASTM D471 by submerging the specimen in ASTM #3 oil for 22 or 70 hours at 123±2° C.

In Table I the amount of maleated EPDM was varied from 0 to 100 parts per 100 parts of the total rubber in the blend. It can be seen therein that the percent elongation increased as the amount of maleated EPDM in the thermoplastic vulcanizate increased. Control 1 did not have a functionalized olefinic rubbery polymer. It can be seen in Control 1 that although a high ultimate tensile strength was achieved therein, the percent elongation was very low. Control 2 did not have a halogenated copolymer of p-alkylstyrene and an isomonoolefin having from 4 to 7 carbon atoms.

TABLE I

Effect of Functionalized EPDM and Bromo XP-50 on Dynamic Vulcanizates of Nylon 6 Functionalized EPDMs and/or Brominated Para-Methyl Styrene/Isobutylene Copolymer (Bromo XP-50)

|  | Ctrl 1 | Ctrl 2 | Ex 3 | Ex 4 | Ex 5 | Ex 6 |
|---|---|---|---|---|---|---|
| Polyamide, 6[1] | 100 | 60 | 60 | 60 | 60 | 60 |
| Maleated EPDM[2] | — | 100 | 20 | 50 | 60 | 80 |
| Bromo XP-50[3] (89-1) | 100 | — | 80 | 50 | 40 | 20 |
| Zinc Oxide | 2 | 2 | 2 | 2 | 2 | 2 |
| SP-1045[4] | 7.5 | 2 | 5 | 5 | 5 | 5 |
| Mg. Oxide | 1 | — | 1 | 1 | 1 | 1 |
| Naugard 445[5] | — | 2 | 2 | 2 | 2 | 2 |
| Initial Physical Properties | | | | | | |
| UTS, MPa | 12.34 | 16.21 | 5.93 | 12.14 | 12.34 | 14.14 |
| % Elongation | 10 | 260 | 85 | 110 | 125 | 180 |
| M 100% MPa | — | 7.97 | — | 11.72 | 11.62 | 10.55 |
| % TS | — | 30 | — | — | — | — |
| OS % Wt Gain | — | — | 137 | 110 | 130 | 163 |
| CS(22 hrs, 125C) | — | 89 | 72 | 72 | 73 | 80 |
| Shore A/D | 50 D | 33 D | 72 A | 39 D | 39 D | 39 D |
| Physical Properties After Hot Air Aging for 168 Hrs at 150° C. as a percentage of the physical property before aging | | | | | | |
| UTS/UTS | — | 97% | 116 | 106 | 123 | 126 |
| % Elong. | — | 88% | 106 | 114 | 136 | 139 |
| M100% | — | 105% | — | 99 | 98 | 95 |
| % Wt Chg | — | -1% | -1 | -1 | -1 | -1 |

TABLE I-continued

Effect of Functionalized EPDM and Bromo XP-50 on Dynamic Vulcanizates of Nylon 6 Functionalized EPDMs and/or Brominated Para-Methyl Styrene/Isobutylene Copolymer (Bromo XP-50)

|  | Ctrl 1 | Ctrl 2 | Ex 3 | Ex 4 | Ex 5 | Ex 6 |
|---|---|---|---|---|---|---|
| Absolute change after aging 168 hrs. at 150° C. | | | | | | |
| Shore A/D change | — | +4 | -3 | +2 | +0 | +2 |

[1]Polyamide 6 is a nylon 6 available from Allied Signal as Capron ® 8202.
[2]Maleated EPDM is RT 465 A and has 1 mole percent of maleated repeat units and is available from Uniroyal.
[3]Bromo XP-50 is available from Exxon. This particular material 89-1 has 1.2 wt. % bromine, 5 wt. % paramethylstyrene and 93.8% isobutylene and a Mooney ML (1 + 8) viscosity 125° C. 35 ± 5.
[4]SP-1045 is a phenolic resin curative available from Schenectedy International.
[5]Naugard 445 is a substituted diphenylamine antioxidant available from Uniroyal.

In Table II the effect of the ratio of the nylon 6 to the rubber in the thermoplastic vulcanizate was evaluated at three different levels of maleated EPDM. It can be seen from each group of the three examples that the ultimate tensile strength and modulus increased with increasing amounts of polyamide in the thermoplastic vulcanizate. The ultimate tensile strength and modulus also increased with the amount of maleated EPDM. A comparison of the thermoplastic vulcanizates of Table I and of Table II in a hot aging test indicates that generally increased amounts of bromo XP-50 decreased the hardening effect (defined as an increase in the ultimate tensile strength and an increase in the 100 percent modulus of the thermoplastic vulcanizates). It is desirable to have minimal changes in physical properties from hot aging as this minimizes variation of physical properties as a result of molding conditions, and also minimizes changes in physical properties as a result of general aging.

TABLE II

Effect of Ratio of Nylon 6 to Rubber in Dynamic Vulcanizates of Nylon 6, Functionalized EPDMs and Brominated Para-Methyl Styrene/Isobutylene Copolymers

|  | Ex 7 | Ex 8 | Ex 9 | Ex 10 | Ex 11 | Ex 12 | Ex 13 | Ex 14 |
|---|---|---|---|---|---|---|---|---|
| Polyamide, 6[1] | 40 | 60 | 70 | 40 | 60 | 70 | 40 | 70 |
| Maleated EPDM[2] | 20 | 20 | 20 | 50 | 50 | 50 | 80 | 80 |
| Bromo XP-50 | 80 | 80 | 80 | 50 | 50 | 50 | 20 | 20 |
| Zinc Oxide | 2 | 2 | 2 | 2 | 2 | 2 | 2 | 2 |
| SP-1045[4] | 5 | 5 | 5 | 5 | 5 | 5 | 5 | 5 |
| Mg. Oxide | 2 | 2 | 2 | 2 | 2 | 2 | 2 | 2 |
| Initial Physical Properties | | | | | | | | |
| UTS, MPa | 5.00 | 5.52 | 14.69 | 5.72 | 16.69 | 18.34 | 12.83 | 20.14 |
| % Elongation | 180 | 85 | 55 | 120 | 125 | 160 | 240 | 220 |
| M 100% MPa | 3.59 | — | — | 4.34 | 15.52 | 15.86 | 7.41 | 16.00 |
| % TS | 13 | — | — | 15 | — | 54 | 25 | 58 |
| OS (125C,22 H) | 210 | — | — | 190 | 78 | 60 | — | 78 |
| CS (125C,22H) | 69 | — | — | 65 | 63 | 61 | 63 | 71 |
| Shore A/D | 54 A | 69 D | 47 D | 68 A | 45 D | 50 D | 79 A | 50 D |

TABLE II-continued

Effect of Ratio of Nylon 6 to Rubber in Dynamic Vulcanizates of Nylon 6, Functionalized EPDMs and Brominated Para-Methyl Styrene/Isobutylene Copolymers

|  | Ex 7 | Ex 8 | Ex 9 | Ex 10 | Ex 11 | Ex 12 | Ex 13 | Ex 14 |
|---|---|---|---|---|---|---|---|---|
| Physical Properties After Hot Air Aging @150° C. for 1 week as a percent of initial physical properties | | | | | | | | |
| UTS/UTS | 128% | — | — | 134 | 87 | 83 | 132 | 96 |
| % Elong/-% Elong | 67% | — | — | 100 | 64 | 75 | 104 | 98 |
| M 100%/M100% | 148% | — | — | 149 | — | 90 | 109 | 94 |
| % Wt Chg (ASTM #3 oil) | <10.5 | — | — | <10.5 | <10.5 | <10.5 | <10.5 | <0.5 |
| Absolute Change After Aging 168 hrs. at 150° C. | | | | | | | | |
| Shore A/D | -2A | — | — | -3A | 0D | -1D | -3A | +1D |

[1]Polyamide 6 is a nylon 6 available from Allied Signal as Capron ® 8202.
[2]Maleated EPDM is RT 465 A and has 1 mole percent of maleated repeat units and is available from Uniroyal.
[3]Bromo XP-50 is available from Exxon. This particular material 89-1 has 1.2 wt. % bromine, 5 wt. % paramethylstyrene and 93.8% isobutylene and a Mooney ML (1 + 8) viscosity 125° 35 ± 5.
[4]SP-1045 is a phenolic resin curative available from Schenectedy International.

50/50 blend of maleated EPDM and Bromo XP-50. Example 19 has dramatically increased ultimate tensile strength and modulus with lower oil swell when compared to Example 15 due to the inclusion of maleated EPDM in Example 19. A comparison of Example 18 to Example 19 shows the effect of endcapping the polyamide. These effects are an increase in the ultimate tensile strength, an increase of the modulus, and a slight decrease in the percent elongation. Example 20 and Example 21 show higher percentages of polyamide in the thermoplastic vulcanizate than Examples 18 and 19, while Examples 16 and 17 show lower percentages of polyamide in the thermoplastic vulcanizate. Example 22 shows a different ratio of maleated EPDM to Bromo XP 50 than does Example 16 which is similar in all other respects. The use of a higher ratio of maleated EPDM resulted in a higher ultimate tensile strength, higher elongation to break, and higher 100 percent modulus. When the modulus and the ultimate tensile strength increased in Example 23, the Shore A/D hardness also increased over that of Example 17. These examples illustrate the ability to generate a wide variety of different moduli and tensile strength with a triblend of a polyamide, a maleated ethylene copolymer, and a halogenated polymer from paraalkylstyrene and an isomonoolefin.

TABLE III

Effect of End-Capping Nylon 6 on Dynamic Vulcanizates of Nylon 6/Maleated EPDM/Bromo XP-50

|  | Ex 15 | Ex 16 | Ex 17 | Ex 18 | Ex 19 | Ex 20 | Ex 21 | Ex 22 |
|---|---|---|---|---|---|---|---|---|
| Polyamide, 6[1] | — | — | 40 | — | 60 | — | 70 | — |
| (End Capped) Exptl Nylon 6 | 60 | 40 | — | 60 | — | 70 | — | 40 |
| Maleated EPDM[2] | — | 50 | 50 | 50 | 50 | 50 | 50 | 80 |
| Bromo XP-50[3] | 100 | 50 | 50 | 50 | 50 | 50 | 50 | 20 |
| Zinc Oxide | 2 | 2 | 2 | 2 | 2 | 2 | 2 | 2 |
| SP-1045[4] | 5 | 5 | 5 | 5 | 5 | 5 | 5 | 5 |
| Mg. Oxide | 2 | 2 | 2 | 2 | 2 | 2 | 2 | 2 |
| Initial Physical Properties | | | | | | | | |
| UTS, MPa | 5.86 | 8.28 | 5.72 | 20.55 | 16.69 | 22.21 | 18.34 | 13.03 |
| % Elongation | 185 | 125 | 120 | 110 | 125 | 90 | 160 | 210 |
| M 100% MPa | 4.76 | 7.59 | 4.34 | 19.34 | 15.52 | — | 15.86 | 9.00 |
| % TS | 29 | — | 15 | — | — | — | 54 | 31 |
| OS (125C,22H) | 164 | 194 | 190 | 65 | 78 | 50 | 60 | 232 |
| CS(125C,22H) | 79 | 66 | 65 | 71 | 63 | 75 | 61 | 77 |
| Shore A/D | 63 A | 73 A | 68 A | 47 D | 45 D | 51 D | 50 D | 33 D |

[1]Polyamide 6 is a nylon 6 available from Allied Signal as Capron ® 8202.
[2]Maleated EPDM is RT 465 A and has 1 mole percent of maleated repeat units and is available from Uniroyal.
[3]Bromo XP-50 is available from Exxon. This particular material 89-1 has 1.2 wt. % bromine, 5 wt. % paramethylstyrene and 93.8% isobutylene. It generally has a Mooney ML (1 + 8) viscosity 125° 35 ± 5.
[4]SP-1045 is a phenolic resin curative available from Schenectedy International.
Exptl Nylon 6 (about 80 mole % endcapped) is available from Allied Signal.

Table III shows the effect of endcapping nylon 6 on the thermoplastic vulcanizates from a polyamide, maleated EPDM and Bromo XP-50. Example 15, wherein an endcapped nylon was used and a maleated EPDM was not included, has improved properties over Control 1 in that it is softer (lower Shore A hardness), has greater elongation (185) and generally is a more elastic thermoplastic vulcanizate. Example 19 varies from Example 15 by having a Thermoplastic vulcanizate compositions of the invention are useful for making a variety of articles such as tires, hoses, belts, seals, gaskets, air ducts, moldings and molded parts. They are particularly useful for making articles by extrusion, injection molding, blow molding and compression molding techniques. They are useful for modifying thermoplastic resins, and in particular, polar thermoplastic resins such as polyamides or polyesters. The compositionsmay be blended with thermoplastic resins using conventional mixing equipment making a rubber modified thermoplastic (e.g., polar thermoplastic). The properties of the modified thermoplastic resin depend upon the amount of thermoplastic vulcanizate compositions added. A preferred use for the thermoplastic vulcanizates of this invention are thermoplastic vulcanizates used at temperatures from about 150° C. to about 200° C.

While in accordance with the patent statutes the best mode and preferred embodiment has been set forth, the scope of the invention is not limited thereto, but rather by the scope of the attached claims.

What is claimed is:

1. A thermoplastic vulcanizate made by dynamic vulcanization, comprising:
   a) a polar thermoplastic phase comprising polyamide, or block copolymer thereof or a mixture thereof, optionally endcapped;
   b) a first olefinic rubbery polymer being either 1) an ethylene rubbery polymer having from about 50 to 75 weight percent repeat units from ethylene and residual repeat units from at least one different monomer, and including at least one carboxylic acid, epoxy, hydroxyl or amine group or a pendant group which is an anhydride of two carboxylic acid groups with the proviso that if carboxylic acid groups are present they are present at a concentration from about 0.1 to about 5 mole percent of the repeating units of said first olefinic rubbery polymer; or 2) a diene based rubbery polymer selected from natural rubber or a polymer having at least 50 weight percent repeat units from at least one conjugated diene, said diene based rubbery polymer including at least one epoxy group; or combinations of said ethylene rubbery polymer and diene based rubbery polymer; and
   c) a crosslinked halogenated rubbery copolymer of paraalkylstyrene and a isomonoolefin of 4 to 7 carbon atoms.

2. The thermoplastic vulcanizate according to claim 1, wherein said polar thermoplastic phase comprises a polyamide or a polyamide block copolymer having at least 40 weight percent polyamide blocks.

3. The thermoplastic vulcanizate according to claim 1, wherein said first olefinic rubbery polymer is present in a weight ratio of from 5:95 to 95:5 with respect to said crosslinked halogenated rubbery copolymer, and said halogenated copolymer is a brominated copolymer of about 1 to 12 weight percent repeat units from p-methylstyrene and from about 88 to about 99 weight percent repeat units from isobutylene.

4. The thermoplastic vulcanizate according to claim 3 wherein said olefinic rubbery polymer comprises an ethylene copolymer that includes from about 0.1 to about 5 mole percent repeat units with either a pendant carboxylic acid group or an anhydride of carboxylic acid groups or combinations thereof.

5. The thermoplastic vulcanizate according to claim 3, wherein said olefinic rubbery polymer comprises maleated EPDM.

6. The thermoplastic vulcanizate according to claim 4, wherein the weight ratio of said first olefinic rubbery polymer to said halogenated copolymer is from about 20:80 to 80:20.

7. The thermoplastic vulcanizate according to claim 5, wherein the weight ratio of said first olefinic rubbery polymer to said halogenated copolymer is from about 20:80 to 80:20.

8. The thermoplastic vulcanizate according to claim 6, wherein said thermoplastic phase is present in an amount from about 10 to 90 phr.

9. The thermoplastic vulcanizate according to claim 7, wherein said thermoplastic phase is present in an amount from about 10 to 90 phr.

10. The thermoplastic vulcanizate according to claim 1, wherein said rubbery ethylene copolymer is a copolymer of at least ethylene and propylene.

11. A process for preparing a thermoplastic vulcanizate, comprising:
    melt mixing polar thermoplastic polymer with
    a) a first olefinic rubber being either 1) an ethylene rubbery polymer having from about 50 to about 75 weight percent repeat units from ethylene and residual repeat units from at least one different monomer, and including at least one pendant carboxylic acid, hydroxyl, amine, or epoxy group or at least one pendant anhydride group from two carboxylic acid groups, with the proviso that if carboxylic acid groups are present they are present at a concentration from about 0.1 to about 5 mole percent of the repeating units of said first olefinic rubbery polymer; or 2) a diene based rubbery polymer being natural rubber or a polymer having at least 50 weight percent repeat units from one or more dienes, said diene based rubbery polymer having at least one epoxy group; or combinations of said ethylene rubbery polymer and diene based rubbery polymer and
    b) a second olefinic rubber being a halogenated copolymer of paraalkylstyrene and an isomonoolefin having 4 to 7 carbon atoms and
    either separately or simultaneously crosslinking said halogenated copolymer and said first olefinic rubber.

12. The process according to claim 11, wherein said polar thermoplastic comprises a thermoplastic polyamide or thermoplastic polyamide block copolymer having at least 40 weight percent polyamide blocks and said halogenated copolymer is a brominated copolymer of about 1 to 12 weight percent repeat units from p-methylstyrene and from about 88 to about 99 weight percent repeat units from isobutylene.

13. The process according to claim 12, wherein said polyamide or polyamide block copolymer in melt form is mixed with said ethylene rubbery polymer or diene based rubbery polymer or combinations thereof and then while still in melt form is mixed with said halogenated copolymer.

14. The process according to claim 12, wherein said ethylene rubbery polymer and/or said diene based elastomer is present in a weight ratio of from about 5:95 to about 95:5 to the weight of said halogenated copolymer.

15. The process according to claim 14, wherein said thermoplastic phase is present in an amount from about 10 to about 90 phr.

16. The process according to claim 15, wherein either said ethylene rubbery polymer or said diene based rubbery polymer or combinations thereof if both are present, are present in a weight ratio of from about 20:80 to 80:20 with respect to said halogenated copolymer.

17. The process according to claim 16, wherein said thermoplastic polymer is blended with said ethylene rubbery polymer and said halogenated copolymer.

18. The process according to claim 17, wherein said ethylene rubbery polymer includes from about 0.1 to about 5 mole percent repeat units with a pendant carboxylic acid group and/or a pendant anhydride group from two carboxylic acid groups.

19. The process according to claim 18, wherein said ethylene rubbery polymer is maleated EPDM.

20. A thermoplastic vulcanizate, comprising:

a) a thermoplastic polyamide optionally being a thermoplastic polyamide block copolymer, b) an ethylene rubbery polymer having from 50 to 75 weight percent repeat units from ethylene and including from about 0.1 to about 5 mole percent repeat units with at least one carboxylic acid group or anhydride of two carboxylic acid groups, or combinations thereof, and c) a brominated copolymer of from about 1 to about 12 p-methylstyrene and from about 88 to about 99 weight percent repeat units from isobutylene, said ethylene rubbery polymer and said brominated copolymer being in a crosslinked form.

* * * * *